United States Patent
Ito

(10) Patent No.: US 9,961,309 B2
(45) Date of Patent: May 1, 2018

(54) IMAGE PROCESSING APPARATUS, IMAGE PROCESSING METHOD, AND PROJECTION APPARATUS

(71) Applicant: CANON KABUSHIKI KAISHA, Tokyo (JP)

(72) Inventor: Motohisa Ito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/969,658

(22) Filed: Dec. 15, 2015

(65) Prior Publication Data

US 2016/0182870 A1 Jun. 23, 2016

(30) Foreign Application Priority Data

Dec. 18, 2014 (JP) ................................ 2014-256675

(51) Int. Cl.
*H04N 5/228* (2006.01)
*H04N 9/31* (2006.01)

(52) U.S. Cl.
CPC ......... *H04N 9/3147* (2013.01); *H04N 9/3188* (2013.01)

(58) Field of Classification Search
CPC ........................ H04N 9/3147; H04N 9/3188
USPC .......................................... 348/222.1, 333.1
See application file for complete search history.

(56) References Cited

U.S. PATENT DOCUMENTS

| | | | | |
|---|---|---|---|---|
| 7,237,911 B2* | 7/2007 | Yamada | ................. | G03B 21/56 348/383 |
| 7,396,135 B2* | 7/2008 | Hasegawa | .............. | G03B 21/26 348/745 |
| 9,779,520 B2* | 10/2017 | Suzuki | .................. | G06T 11/005 |
| 2008/0170122 A1* | 7/2008 | Hongo | ...................... | G06T 7/33 348/148 |

FOREIGN PATENT DOCUMENTS

JP 2011-211693 A 10/2011
JP 5298738 B2 9/2013

OTHER PUBLICATIONS

U.S. Appl. No. 14/940,476, filed Nov. 13, 2015, inventor Ito.

* cited by examiner

*Primary Examiner* — Yogesh Aggarwal
(74) *Attorney, Agent, or Firm* — Carter, DeLuca, Farrell & Schmidt, LLP

(57) ABSTRACT

A projected image including at least an image of an overlapping region, on which a first video and a second video are superimposed, is obtained. A correction value for each unit region is determined based on the projected image and an image of a corresponding region in the first video. The corresponding region corresponds to the overlapping region, and the unit region is divided from the overlapping region. Projection-position adjustment based on the correction value is applied to the first video in each unit region.

22 Claims, 11 Drawing Sheets

FIG. 8A

| | | $\left(\dfrac{100}{22}, \dfrac{60}{13}\right)$ | | |
|---|---|---|---|---|
| | | $\left(\dfrac{100}{21}, \dfrac{60}{14}\right)$ | | |
| $\left(\dfrac{175}{31}, \dfrac{100}{23}\right)$ | $\left(\dfrac{175}{33}, \dfrac{100}{24}\right)$ | (5,4) | $\left(\dfrac{75}{17}, \dfrac{60}{16}\right)$ | $\left(\dfrac{75}{19}, \dfrac{60}{17}\right)$ |
| | | $\left(\dfrac{150}{29}, \dfrac{100}{24}\right)$ | | |
| | | $\left(\dfrac{150}{28}, \dfrac{100}{23}\right)$ | | |

FIG. 8B

| | | | | |
|---|---|---|---|---|
| $\left(\dfrac{100}{22}, \dfrac{60}{13}\right)$ | $\left(\dfrac{100}{22}, \dfrac{60}{13}\right)$ | $\left(\dfrac{100}{22}, \dfrac{60}{13}\right)$ | $\left(\dfrac{100}{22}, \dfrac{60}{13}\right)$ | $\left(\dfrac{75}{19}, \dfrac{60}{17}\right)$ |
| $\left(\dfrac{175}{31}, \dfrac{100}{23}\right)$ | $\left(\dfrac{100}{21}, \dfrac{60}{14}\right)$ | $\left(\dfrac{100}{21}, \dfrac{60}{14}\right)$ | $\left(\dfrac{75}{17}, \dfrac{60}{16}\right)$ | $\left(\dfrac{75}{19}, \dfrac{60}{17}\right)$ |
| $\left(\dfrac{175}{31}, \dfrac{100}{23}\right)$ | $\left(\dfrac{175}{33}, \dfrac{100}{24}\right)$ | (5,4) | $\left(\dfrac{75}{17}, \dfrac{60}{16}\right)$ | $\left(\dfrac{75}{19}, \dfrac{60}{17}\right)$ |
| $\left(\dfrac{175}{31}, \dfrac{100}{23}\right)$ | $\left(\dfrac{175}{33}, \dfrac{100}{24}\right)$ | $\left(\dfrac{150}{29}, \dfrac{100}{24}\right)$ | $\left(\dfrac{150}{29}, \dfrac{100}{24}\right)$ | $\left(\dfrac{75}{19}, \dfrac{60}{17}\right)$ |
| $\left(\dfrac{175}{31}, \dfrac{100}{23}\right)$ | $\left(\dfrac{150}{28}, \dfrac{100}{23}\right)$ | $\left(\dfrac{150}{28}, \dfrac{100}{23}\right)$ | $\left(\dfrac{150}{28}, \dfrac{100}{23}\right)$ | $\left(\dfrac{150}{28}, \dfrac{100}{23}\right)$ |

IMAGE PROCESSING APPARATUS, IMAGE PROCESSING METHOD, AND PROJECTION APPARATUS

BACKGROUND OF THE INVENTION

Field of the Invention

The present invention relates to a technique of performing superimposed projection of a plurality of videos.

Description of the Related Art

There is known a multi-projection system that displays a video on a large screen or a non-flat projection surface by combining a plurality of projection video display devices (to be referred to as "projectors" hereinafter). Projection methods in the multi-projection system include stack projection in which a plurality of projectors project the same video on the same projection surface, and multiple projection in which respective projectors perform projection of respective regions obtained by dividing one video and the divided regions are joined on the projection surface. In either projection method, the projection surface has an overlapping region where a plurality of projected images overlap each other. In the stack projection, superimposed projection of the same video is performed, so the entire projected image corresponds to an overlapping region. To the contrary, in the multiple projection, superimposed projection is applied to part of adjacent projected images in order to make the joint of a video less conspicuous. In the multiple projection, an overlapping region exists at the joint of the projected images.

In the overlapping region, the projected positions of respective videos need to coincide with each other. If a projected position has a displacement, the resolution of the entire projected image decreases, degrading the image quality. Main causes of the displacement of a projected position by a plurality of projectors are temporal change of an optical component, deformation of an optical component and support member by heat of a light source, movement of a projector housing by vibrations of a member, and the like. Since the projector enlarges and displays a video by projection, even a small change of the optical component or the like appears as a large displacement on the projection surface. For example, a change of the optical component occurred by the temporal change appears as a larger displacement of the projected position on the projection surface. Since the temporal change does not have homogeneity, the displacement amount of the projected position is spatially and temporally inhomogeneous.

There has been proposed a technique of suppressing generated image quality degradation in accordance with a displacement between the positions of a plurality of videos in an overlapping region in a multi-projection system. Japanese Patent No. 5298738 (literature 1) discloses a technique of performing image correction corresponding to the displacement of a projected position using a detection pattern. Japanese Patent Laid-Open No. 2011-211693 (literature 2) discloses a technique of enabling image correction corresponding to the displacement of a projected position even during projection of a video using an invisible detection pattern.

However, since the technique disclosed in literature 1 executes correction using a detection pattern of visible light, correction corresponding to the displacement of a projected position cannot be executed during projection of a video and adaptive correction is impossible. The technique disclosed in literature 1 executes uniform image correction on an entire projected image. If this technique is applied to a projected image having an inhomogeneous displacement, a region where correction is insufficient or excessive is generated. Therefore, the technique disclosed in literature 1 has a poor image quality degradation suppressing effect for a projected image having an inhomogeneous displacement.

The technique disclosed in literature 2 executes correction using an invisible detection pattern, and can execute image correction corresponding to the displacement of a projected position even during projection of a video and can execute adaptive correction. However, as in literature 1, the technique disclosed in literature 2 executes uniform image correction on an entire projected image, and has a poor image quality degradation suppressing effect for a projected image having an inhomogeneous displacement.

SUMMARY OF THE INVENTION

In one aspect, an image processing apparatus for performing projection-position adjustment in a superimposed projection of a plurality of videos, the apparatus comprising: an acquisition unit configured to acquire a projected image including at least an image of an overlapping region on which a first video and a second video are superimposed; a first determination unit configured to determine a correction value for each unit region based on the projected image and an image of a corresponding region in the first video, wherein the corresponding region corresponds to the overlapping region and the unit region is divided from the overlapping region; and a correction unit configured to apply the projection-position adjustment based on the correction value to the first video in each unit region.

According to the aspect, image quality degradation caused by the displacement of a projected position and generated in an overlapping region in superimposed projection of a plurality of videos can be suppressed adaptively and effectively during projection of the videos.

Further features of the present invention will become apparent from the following description of exemplary embodiments with reference to the attached drawings.

BRIEF DESCRIPTION OF THE DRAWINGS

FIG. 8A is a view showing the calculation result of the correction value of an intermediate pixel.

FIG. 8B is a view showing the determination result of the correction value of a non-intermediate pixel.

DESCRIPTION OF THE EMBODIMENTS

Figure 1:
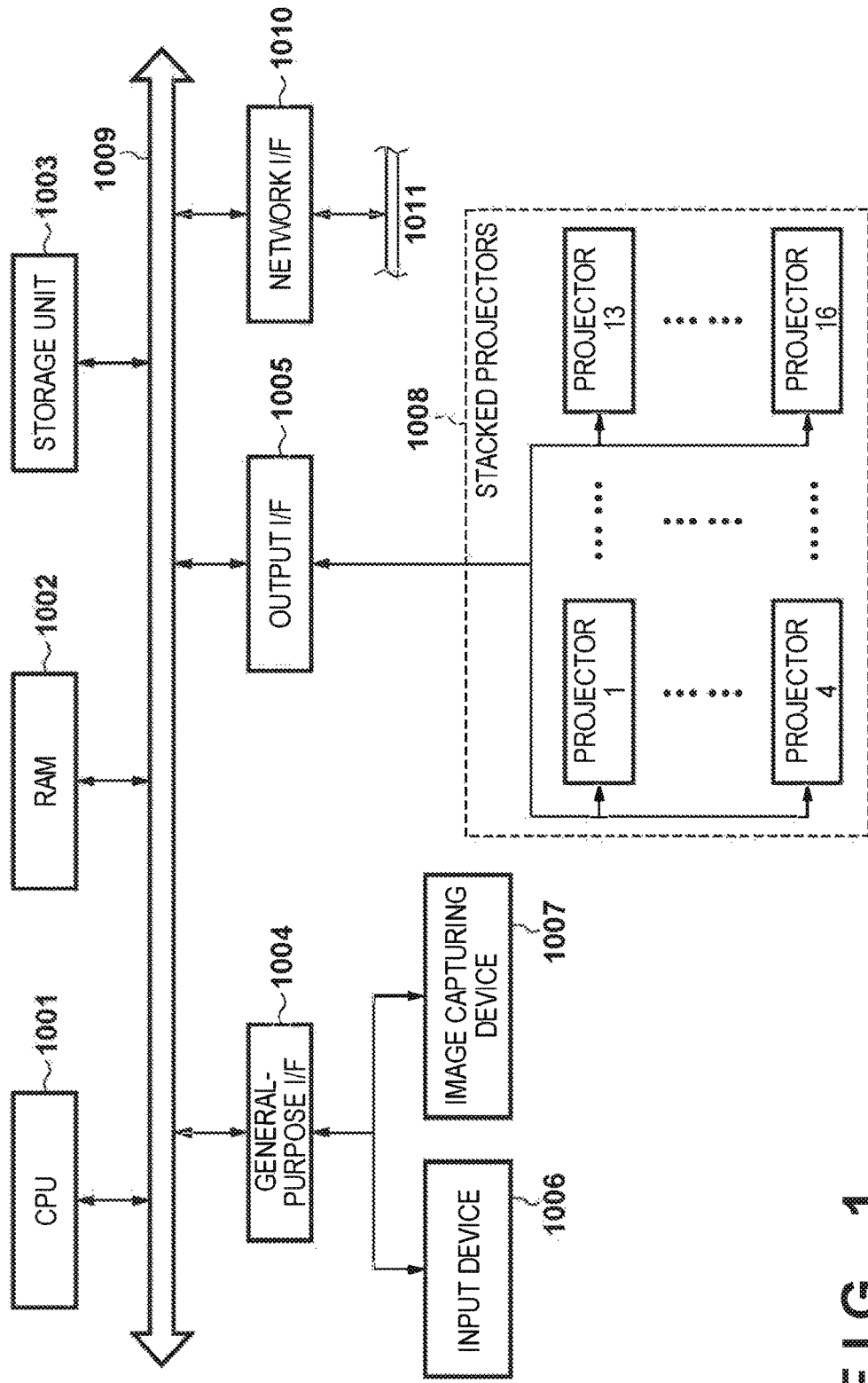
FIG. 1 is a block diagram showing the arrangement of a multi-projection system according to an embodiment.

An image processing apparatus, an image processing method, and a projection apparatus according to embodiments of the present invention will now be described with reference to the accompanying drawings. However, the embodiments and details can be changed without departing from the spirit and scope of the present invention. Therefore, the present invention is not limited to the contents of the description of the embodiments. An arrangement in the following embodiments can be implemented as hardware or software, unless otherwise specified. Note that the same reference numerals denote building components having the same functions in principle, and a repetitive description thereof will be omitted.

First Embodiment

The first embodiment will explain an example in which image quality degradation caused by the displacement of a projected position in an overlapping region where the first video and the second video overlap each other in a multi-projection system that performs superimposed projection using a plurality of projectors is suppressed during projection of the videos. That is, image correction corresponding to the displacement of a projected position is performed on a projected image constituting the overlapping region, thereby suppressing image quality degradation caused by the displacement and giving an effect as if the displacement of the projected position were canceled. This correction on a video to be projected will be called "projected position adjustment" for convenience.

Prior to a description of the projected position adjustment method in the embodiment, a "unit region" and "differential vector" used in the following description will be defined.

First, the "unit region" is a unit region where calculation of the displacement (difference) of a projected position, calculation of a correction value used in projected position adjustment, and determination of whether to execute projected position adjustment are performed. The shape and size of the unit region are set in advance. The unit region and the overlapping region have the following relation:

$$(\Psi, \Phi) = (mx, ny) \quad (1)$$

where $(\Psi, \Phi)$ is the size of the overlapping region,
(x, y) is the size of the unit region, and
m and n are positive integers.

The "differential vector" is a vector representing the displacement of a projected position generated between a plurality of projected images present in an overlapping region. A differential vector diff is defined by:

$$\text{diff} = \{I(k) - I_0(k)\}/2 \quad (2)$$

where $I_0(k)$ is the vector indicating the projected position of a unit region k projected by a given projector, and
$I(k)$ is the vector indicating the projected position of the unit region k projected by a projector other than the given projector.

[Apparatus Arrangement]

The arrangement of a multi-projection system according to the embodiment will be explained with reference to FIG. 1. Referring to FIG. 1, a microprocessor (CPU) 1001 executes a program stored in a storage unit 1003 such as a hard disk drive (HDD) using a random access memory (RAM) 1002 as a work memory, and controls each building component connected through a main bus 1009.

A general-purpose interface (I/F) 1004 is a serial bus interface such as a USB (Universal Serial Bus) that connects an input device 1006 including a mouse and keyboard, an image capturing device 1007, and the like to the main bus 1009. A network I/F 1010 is an interface with a wired or wireless network 1011. The image capturing device 1007 may be connected to the main bus 1009 through the network I/F 1010.

An output I/F 1005 includes a plurality of video interfaces such as HDMI® (High-Definition Multimedia Interface) and DisplayPort™ that connect, to the main bus 1009, stacked projectors 1008 in which a plurality of projectors are stacked.

As is apparent from the arrangement shown in FIG. 1, the multi-projection system according to the embodiment is implemented by a plurality of projectors, and a computer apparatus that controls images projected by these projectors. Note that FIG. 1 shows an example of the multi-projection system using the stacked projectors 1008 including a total of 16 projectors in a 4×4 stack configuration. However, the number of projectors and the stack configuration are not limited to this example, and the present invention is applicable to a system that performs superimposed projection using a plurality of projectors.

[Processing Arrangement]

Figure 2:
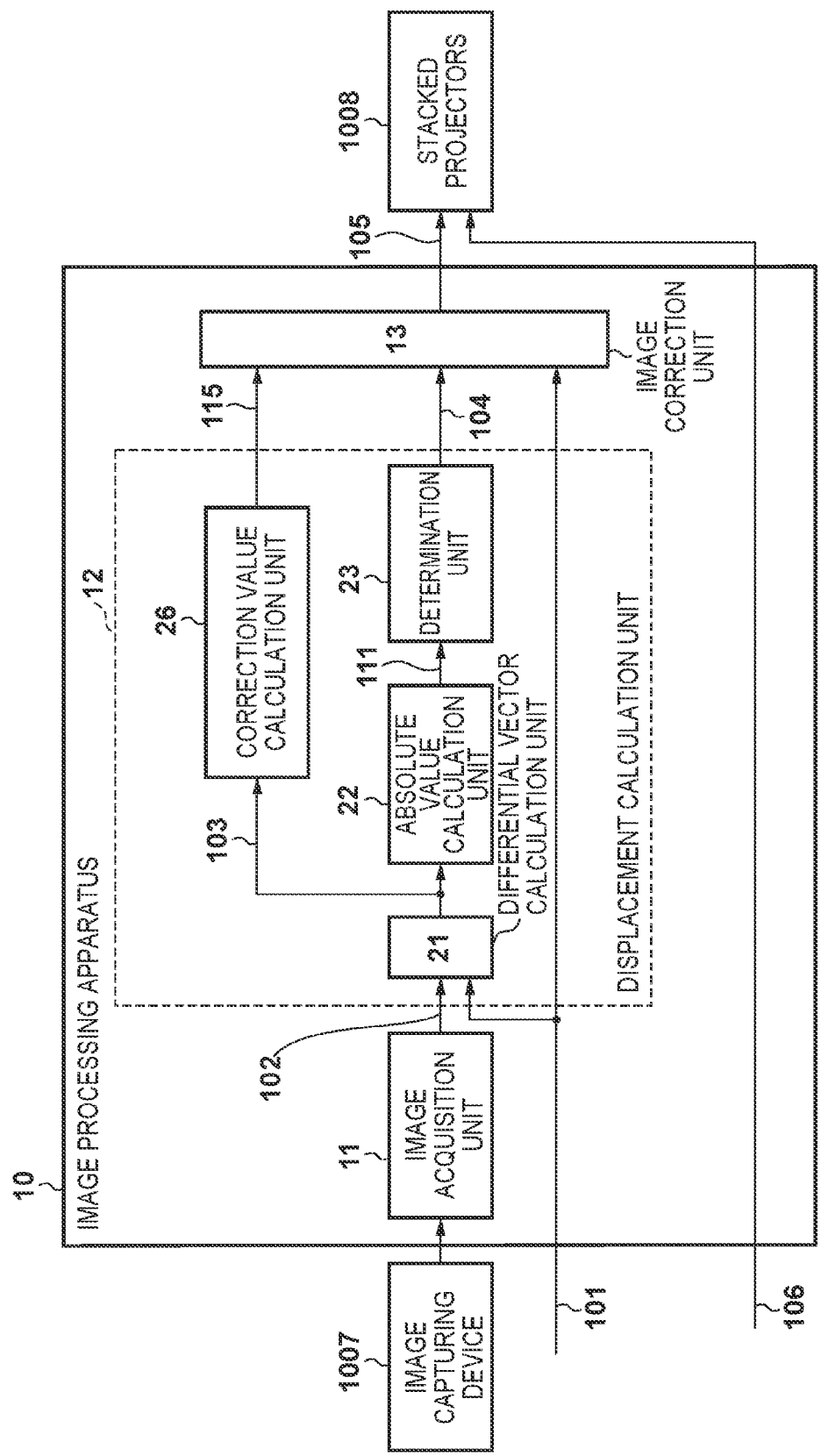
FIG. 2 is a block diagram showing the arrangement of an image processing apparatus that performs projected position adjustment in the multi-projection system according to the embodiment.

FIG. 2 shows the arrangement of an image processing apparatus 10 that performs projected position adjustment in the multi-projection system according to the embodiment. The image processing apparatus 10 is implemented by executing, by the CPU 1001, an image processing program for the multi-projection system according to the embodiment that is stored in the storage unit 1003. To simplify the description, projected position adjustment when two videos are projected by stack projection or multiple projection will be explained.

The image processing apparatus 10 receives an input video 101 that is projected by a given projector (to be referred to as a "first projector" hereinafter) among the stacked projectors 1008, performs projected position adjustment on the input video 101, and outputs an output video 105 after the adjustment to the first projector. Another projector (to be referred to as a "second projector" hereinafter) among the stacked projectors 1008 receives an input video 106 that is to be superimposed and projected on a video projected by the first projector. Note that the input videos 101 and 106 are read out from the storage unit 1003 or input to the image processing apparatus 10 through the general-purpose I/F 1004 or the network I/F 1010.

The image processing apparatus 10 includes an image acquisition unit 11, a correction determination unit 12, and an image correction unit 13. The image acquisition unit 11 acquires a projected image on a projection surface as a projected image 102 from the image capturing device 1007.

Based on the input video 101 and the projected image 102, the correction determination unit 12 calculates a differential vector 103 indicating the degree of displacement of each unit region in the overlapping region of the input videos 101 and 106. Further, based on the differential vector 103, the correction determination unit 12 generates a correction execution signal 104 representing whether to execute projected position adjustment, and a correction value 115 to be used in projected position adjustment.

The image correction unit 13 generates the output video 105 by applying projected position adjustment to the input video 101 based on the correction execution signal 104 and the correction value 115 for each unit region. Note that the unit region is a square of 5×5 pixels. That is, (x, y)=(5, 5). The image capturing device 1007, the image acquisition unit 11, the correction determination unit 12, and the image correction unit 13 will be explained below.

[Image Capturing Device]

The image capturing device 1007 captures a projected image on the projection surface, and outputs the projected image 102. The arrangement and installation location of the image capturing device 1007 are not limited as long as a projected image on the projection surface can be acquired for each pixel. For example, a two-dimensional image sensor is applicable as the image capturing device 1007, and the two-dimensional image sensor may be a color sensor or a panchromatic sensor.

Figure 3A:
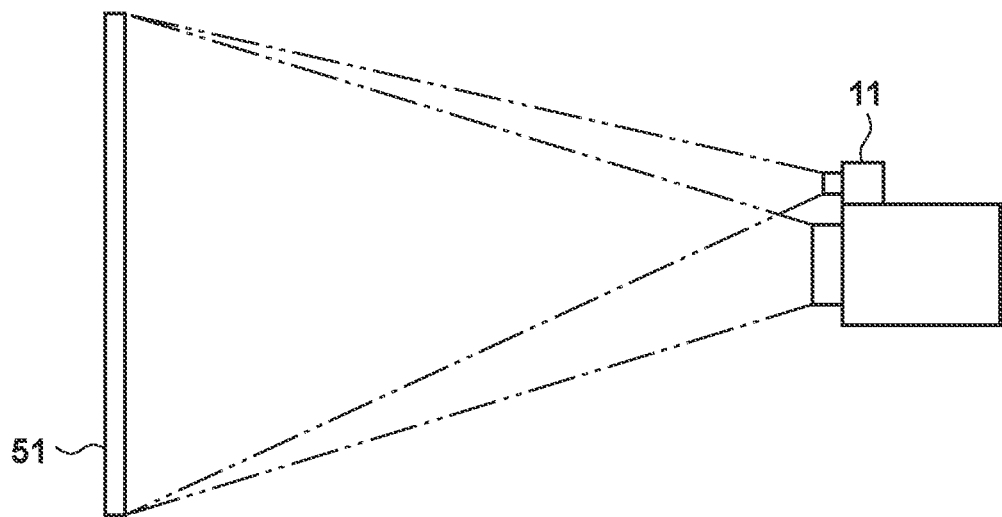
FIGS. 3A and 3B are views showing examples of the installation location of an image capturing device.
Figure 3B:
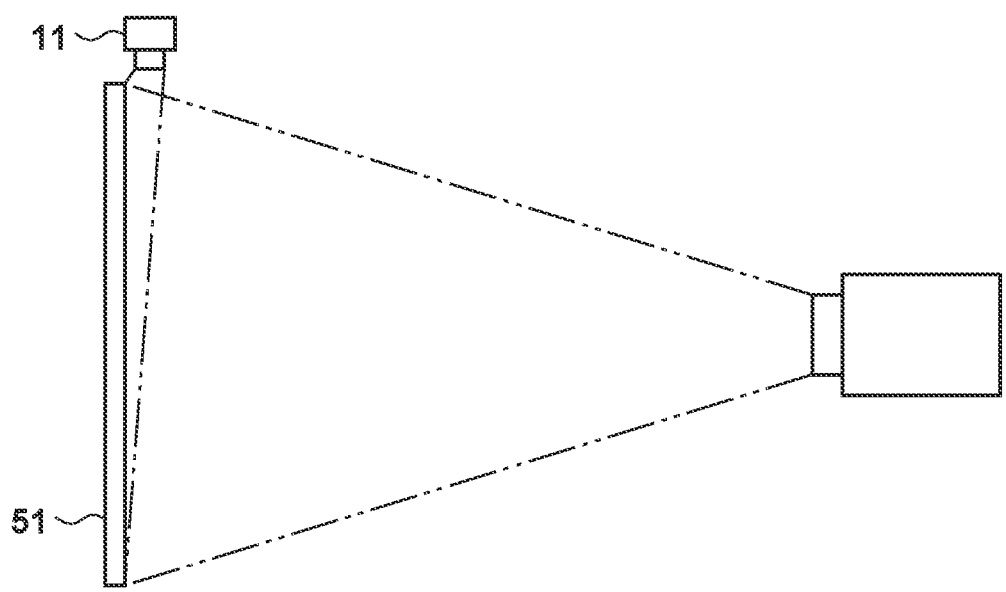

FIGS. 3A and 3B show examples of the installation location of the image capturing device 1007. FIG. 3A shows an example in which the image capturing device 1007 is installed near (for example, at the top of) the housing of the projector. When the image capturing device 1007 is installed near the housing of the projector, a projected image on an entire projection surface 51 can be easily acquired.

FIG. 3B shows an example in which the image capturing device 1007 is installed near (for example, at the top of) the projection surface 51. In this case, a long wire cable or wireless network connection is necessary for the connection between the image capturing device 1007 and the multi-projection system, but a projected image on the entire projection surface 51 can be acquired.

Note that the installation location of the image capturing device 1007 is not limited to the position shown in FIGS. 3A or 3B. The installation location of the image capturing device 1007 is arbitrary as long as images in an overlapping region and its surrounding region in a projected image on the projection surface 51 can be acquired.

[Image Acquisition Unit]

The image acquisition unit 11 sets at least an overlapping region in a projected image as an acquisition target region. Further, if a region surrounding the overlapping region is included in the acquisition target region, alignment work at the time of installing the image capturing device 1007 becomes easy, and movement of the overlapping region caused by the temporal change can be coped with. However, as the acquisition target region becomes larger, the data amount of the projected image 102 becomes larger, influencing the processing of the correction determination unit 12. Hence, the overlapping region and its surrounding region included in the acquisition target region are determined to have a sufficient shape and a minimum size. The shape and size of the acquisition target region suffice to be determined based on the characteristic of the optical system of the projector and the image acquisition characteristic of the image capturing device 1007.

The time interval at which the image acquisition unit 11 acquires the projected image 102 depends on the time interval at which projected position adjustment is performed. Letting α be the interval of projected position adjustment, and β be the acquisition interval of the projected image 102, α and β have the following relation:

$$\alpha \leq \beta \quad (3)$$

[Displacement Calculation Unit]

The correction determination unit 12 includes a differential vector calculation unit 21, an absolute value calculation unit 22, a determination unit 23, and a correction value calculation unit 26.

Differential Vector Calculation Unit

The differential vector calculation unit 21 calculates the differential vector 103 for each unit region based on the input video 101 and the projected image 102. At this time, it is necessary to specify a region (to be referred to as a "corresponding region" hereinafter) of the input video 101 that corresponds to an overlapping region in the projected image 102. However, since the acquisition target region of the projected image 102 in the image acquisition unit 11 is limited, a region complying with the acquisition target region is set as the corresponding region.

The present invention does not depend on the calculation method of the differential vector 103, so a known technique can be used to detect the displacement of a projected position and calculate the differential vector 103. An example of the calculation method of the differential vector 103 is a method of detecting a displacement based on the edge of an image.

When the edge-based displacement detection method is applied, first, edge detection processing is performed on an image in the corresponding region of the input video 101 and the projected image 102. At this time, if there is a temporal difference between the input video 101 and the projected image 102, it is preferable to apply a delay circuit to the edge detection result of the input video 101 and cancel the temporal difference. That is, the input video 101 and projected image 102 to undergo displacement detection preferably correspond to the same video frame.

Subsequently, the differential vector calculation unit 21 generates a differential video by subtracting the edge detection result of the input video 101 from the edge detection result of the projected image 102. Since no displacement exists between the projected image 102 and the input video 101 in a unit region having a value of 0 in the differential video, the value of the differential vector 103 of this unit region is (0, 0). In contrast, since a displacement exists between the projected image 102 and the input video 101 in a unit region having a nonzero value in the differential video, the differential vector (diff) 103 of this unit region is calculated from the differential video according to equation (2).

Note that the calculation method of the differential vector 103 is not limited to the above-described method based on the edge of an image, and an arbitrary method is applicable as long as the differential vector 103 can be calculated for each unit region. The input video 101 and projected image 102 to undergo calculation of the differential vector 103 need not always correspond to the same video frame. For example, the input video 101 and the projected image 102 suffice to correspond to similar video frames such as preceding and succeeding video frames in the same scene. When the input video 101 and the projected image 102 correspond to different video frames in the same scene, the differential vector 103 is calculated for a region having a small motion in the overlapping region. This can reduce generation of an error due to the difference between video frames.

Absolute Value Calculation Unit

The absolute value calculation unit 22 calculates an absolute value 111 of the differential vector 103:

$$mag = \sqrt{(x^2 + y^2)} \quad (4)$$

where mag is the absolute value 111, and
(x, y) is the differential vector (diff) 103.

Determination Unit

The determination unit 23 determines whether to perform projected position adjustment for each unit region, and outputs the determination result as the correction execution signal 104. Each bit of the correction execution signal 104 indicates whether to execute correction for each unit region. Hence, when the number of unit regions is k, the number of bits of the correction execution signal 104 is k. The correction execution signal 104 takes a lower value in accordance with whether to execute projected position adjustment. Note that a parenthesized code is a mnemonic code in the following assignment:

to execute correction for the unit region: '1' (VALID)
not to execute correction for the unit region: '0' (IN-VALID)

If the absolute value mag of the differential vector 103 of a unit region of interest is equal to or larger than a threshold, the determination unit 23 determines to execute projected position adjustment, and sets VALID as the value of a corresponding bit of the correction execution signal 104. If the absolute value mag of the differential vector 103 of the unit region of interest is smaller than the threshold, the determination unit 23 determines not to execute projected position adjustment, and sets INVALID as the value of a corresponding bit of the correction execution signal 104. The threshold used for this determination is determined in advance in accordance with the characteristic of the projector, and is held in the determination unit 23. Note that this threshold may be not a fixed value but changeable by the user of the multi-projection system, as needed.

Correction Value Calculation Unit

The correction value calculation unit 26 calculates the correction value 115 to be used in projected position adjustment for each pixel. The image correction unit 13 corrects an image in a corresponding region of the input video 101 in accordance with the correction value 115, generating the output video 105. The correction value 115 indicates the position displacement amount of the pixel, and (x, y) components indicate moving amounts of the pixel in the x and y directions.

Note that the video frame of the input video 101 to undergo projected position adjustment should be the same video frame (to be referred to as a "reference frame" hereinafter) referred to at the time of calculating the correction value 115. However, no correction can be performed on an already projected reference frame. Therefore, the video frame of the input video 101 to undergo correction is a video frame after the reference frame.

Correction Value

The correction value 115 will be explained. A unit region of interest will be referred to as a first unit region 31, and a unit region adjacent to the first unit region 31 will be referred to as a second unit region 32. The differential vectors of the first unit region 31 and second unit region 32 and their components are defined as follows:

the differential vector of the first unit region 31: diff1=(x1, y1)
the differential vector of the second unit region 32: diff2=(x2, y2)

The x component of the correction value 115 that is set for pixels (to be referred to as "intermediate pixels" hereinafter) on a line segment connecting the center of the first unit region 31 and the center of the second unit region 32 is calculated or set in accordance with the magnitude relationship between a displacement x1 in the X direction in the first unit region 31 and a displacement x2 in the X direction in the second unit region 32:

(condition A) if (x1>x2)
a harmonic progression having x1 as an upper limit value and x2 as a lower limit value is calculated as the x component;

(condition B) if (x1<x2)
a harmonic progression having x2 as an upper limit value and x1 as a lower limit value is calculated as the x component;

(condition C) if (x1=x2)
all the x components are equal, and x1 (=x2) is set as the value of the x component;

Similarly, the y component of the correction value 115 that is set for an intermediate pixel is calculated or set in accordance with the magnitude relationship between a displacement y1 in the Y direction in the first unit region 31 and a displacement y2 in the Y direction in the second unit region 32:

(condition D) if (y1>y2)
a harmonic progression having y1 as an upper limit value and y2 as a lower limit value is calculated as the y component;

(condition E) if (y1<y2)
a harmonic progression having y2 as an upper limit value and y1 as a lower limit value is calculated as the y component;

(condition F) if (y1=y2)
all the y components are equal, and y1 (=y2) is set as the value of the y component;

In this manner, a harmonic progression having the displacement amount (x1, y1) of the unit region of interest and the displacement amount (x2, y2) of the adjacent unit region as upper and lower limits is set for the correction value of an intermediate pixel. As a result, a transition by projected position adjustment is sensed naturally by the human vision.

Calculation of Correction Value of Intermediate Pixel

Next, a method of calculating the correction value 115 for intermediate pixels will be explained with reference to FIGS. 4A and 4B.

Figure 4A:
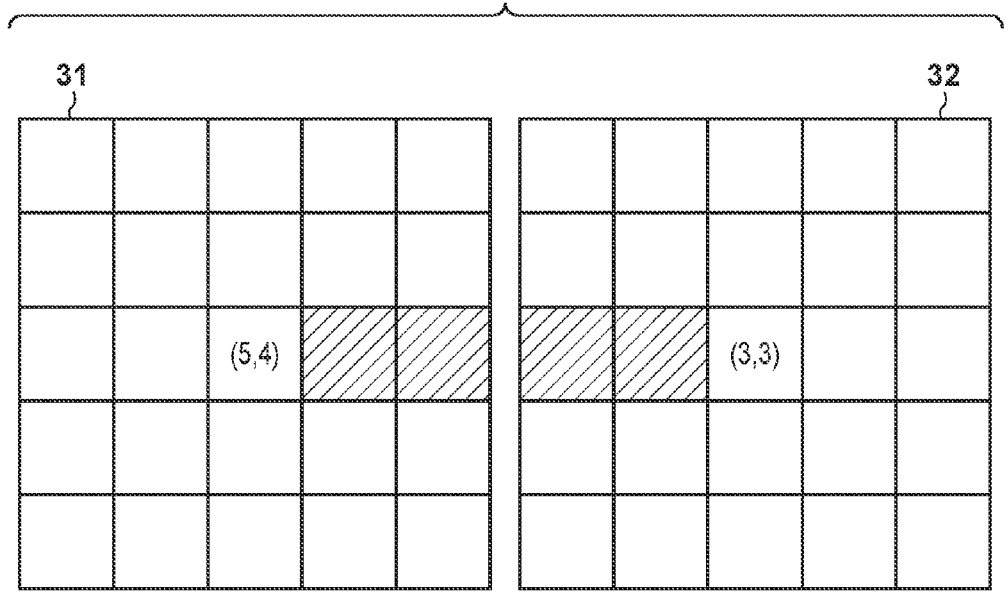
FIGS. 4A and 4B are views for explaining a method of calculating the correction value of an intermediate pixel.

As shown in FIG. 4A, the differential vector diff1 of the first unit region 31 is set as (x1, y1)=(5, 4), and the differential vector diff2 of the second unit region 32 is set as (x2, y2)=(3, 3). In this case, intermediate pixels are six pixels including the center pixels of the respective regions.

First, the x component of the correction value 115 is calculated. In this example, x1=5 and x2=3, which corresponds to the above-described condition A. Hence, the x component of the correction value 115 set for the intermediate pixels is represented by a harmonic progression of six elements having x1=5 as an upper limit and x2=3 as a lower limit. A harmonic progression representing the x component of the correction value 115 is an arithmetic progression in which the reciprocal is a tolerance of 2/75:

{5, 75/17, 75/19, 75/21, 75/23, 3}

Then, the y component of the correction value 115 is calculated. In this example, y1=4 and y2=3, which corresponds to condition D. The y component of the correction value 115 set for the intermediate pixels is represented by a harmonic progression of six elements having y1=4 as an upper limit and y2=3 as a lower limit. A harmonic progression representing the y component of the correction value 115 is an arithmetic progression in which the reciprocal is a tolerance of 1/60:

{4, 60/16, 60/17, 60/18, 60/19, 3}

Figure 4B:
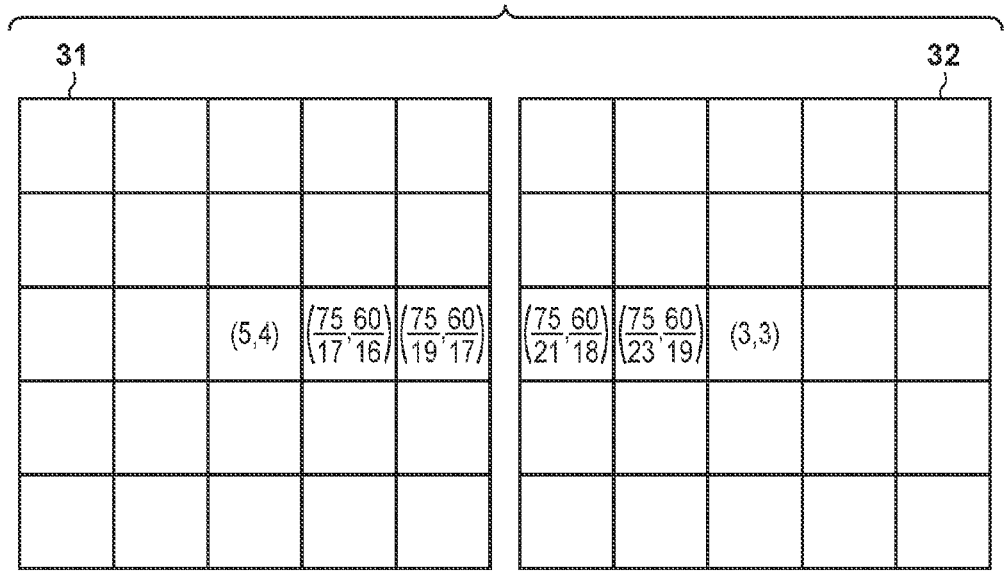

FIG. 4B shows an example in which the correction value 115 calculated for an intermediate pixel is represented by a vector for each pixel.

Calculation of Correction Value of Non-intermediate Pixel

Subsequently, a method of calculating the correction value 115 for pixels (to be referred to as "non-intermediate pixels" hereinafter) other than intermediate pixels will be explained.

Figure 5A:
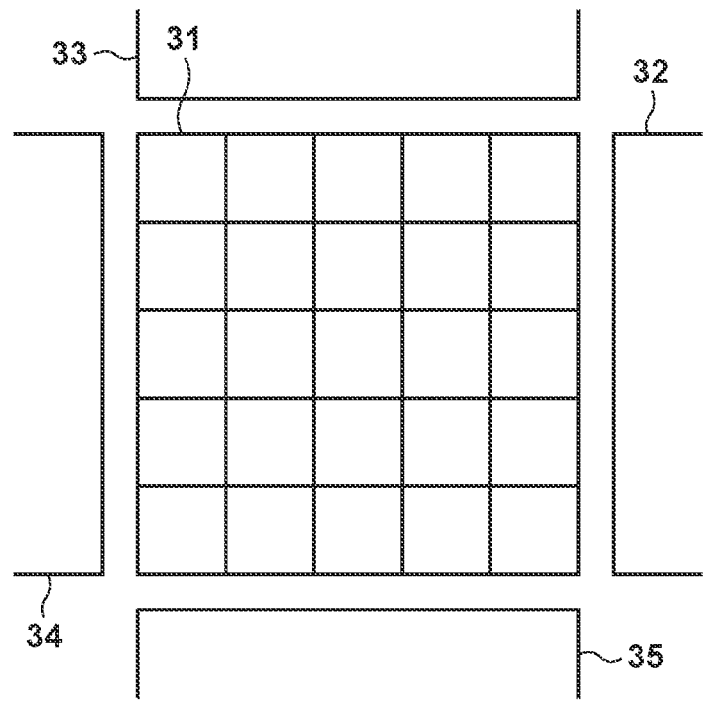
FIGS. 5A and 5B are views for explaining division of a unit region.

Division of a unit region of interest will be explained with reference to FIGS. 5A and 5B. FIG. 5A shows the arrangement of the first unit region 31 and unit regions around the first unit region 31. The second unit region 32 is adjacent to the right side of the first unit region 31, and a third unit region 33, a fourth unit region 34, and a fifth unit region 35 are adjacent counterclockwise. Four unit regions adjacent to the first unit region 31 in the vertical and horizontal directions are adjacent unit regions. In this arrangement, the first unit region 31 serving as a unit region of interest is divided as follows.

Step 1: Line segments are drawn from the center of the first unit region 31 to the two ends of a boundary line between the first unit region 31 and each adjacent unit region.

Step 2: The first unit region 31 is divided into polygons each formed by the line segments drawn in step 1 and the boundary line between the first unit region 31 and the adjacent unit region.

In other words, the polygon is formed by the boundary line between the unit region of interest and a unit region adjacent to the unit region of interest, and the line segments connecting the center of the unit region of interest and the two ends of the boundary line.

Figure 5B:
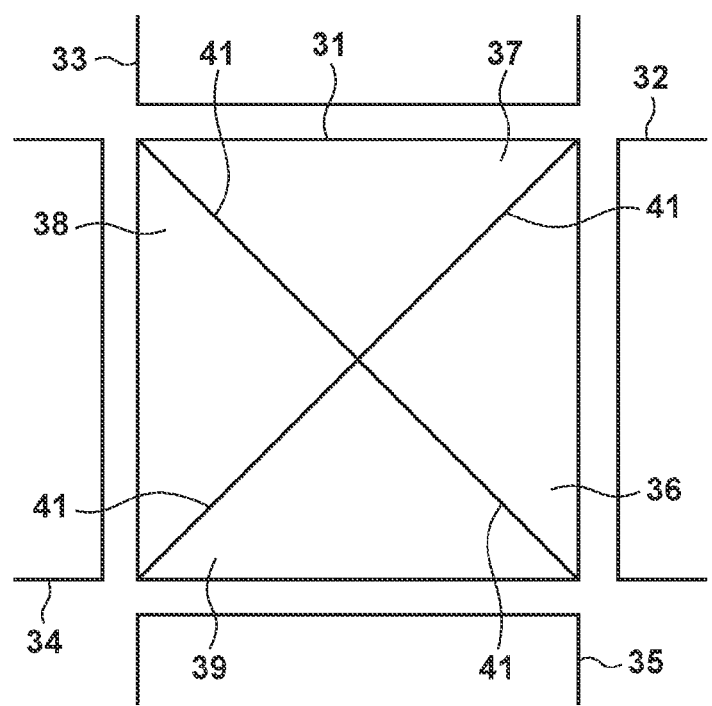

FIG. 5B shows a result of dividing the first unit region 31. The first unit region 31 is divided into four polygons 36 to 39 formed by line segments 41 drawn in step 1, and boundary lines between the first unit region 31 and the adjacent unit regions.

For pixels (to be referred to as "diagonal pixels" hereinafter) positioned on the center of the first unit region 31 and the line segments 41, a belonging relationship with the polygon is determined in accordance with the following conditions. Needless to say, pixels excluding the center pixel and diagonal pixels belong to a polygon including these pixels.

(condition G) the center pixel belongs to all the first polygon 36 to the fourth polygon 39, and (condition H) each diagonal pixel belongs to a polygon on the left side when oriented to the center.

Figure 6:
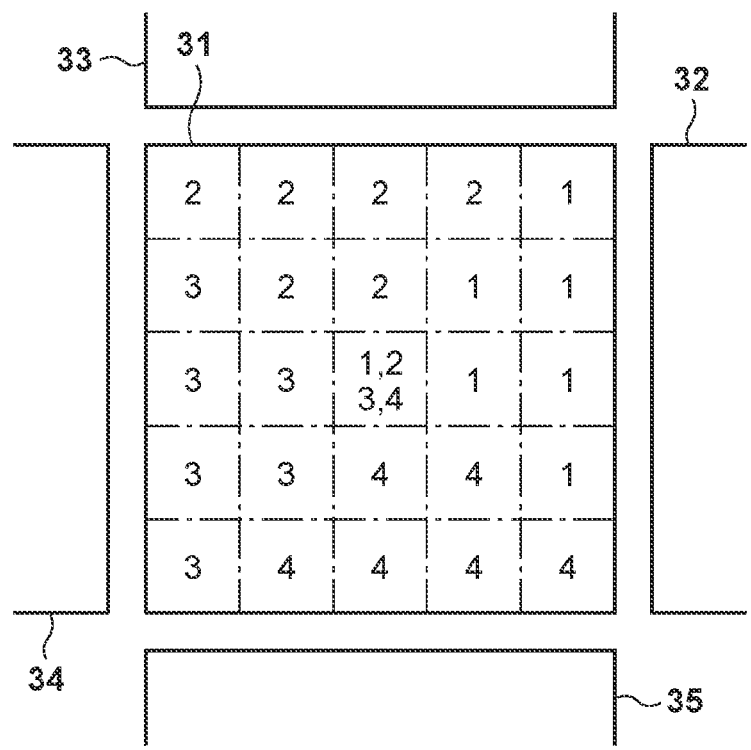
FIG. 6 is a view showing the belonging relationship between a polygon and pixels.

FIG. 6 shows the belonging relationship between the pixels of the first unit region 31 and the polygons, which are determined under the above-described conditions. A numeral described in each pixel represents the number of a polygon to which the pixel belongs. The relationship between a polygon to which a pixel belongs, and a differential vector used in calculation of the correction value 115 is as follows:

pixels belonging to the first polygon 36: the differential vector between the first unit region 31 and the second unit region 32, pixels belonging to the second polygon 37: the differential vector between the first unit region 31 and the third unit region 33, pixels belonging to the third polygon 38: the differential vector between the first unit region 31 and the fourth unit region 34, pixels belonging to the fourth polygon 39: the differential vector between the first unit region 31 and the fifth unit region 35

Figure 7A:
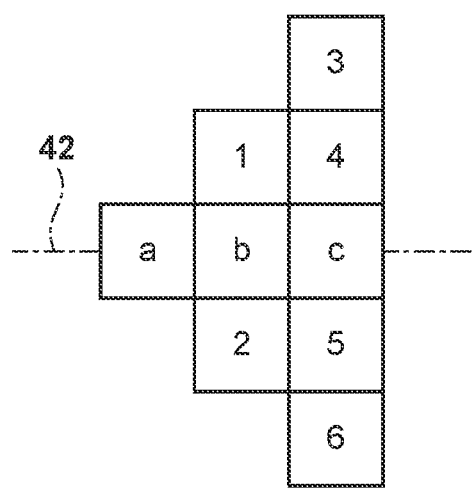
FIGS. 7A and 7B are views for explaining a method of determining the correction value of a non-intermediate pixel.
Figure 7B:
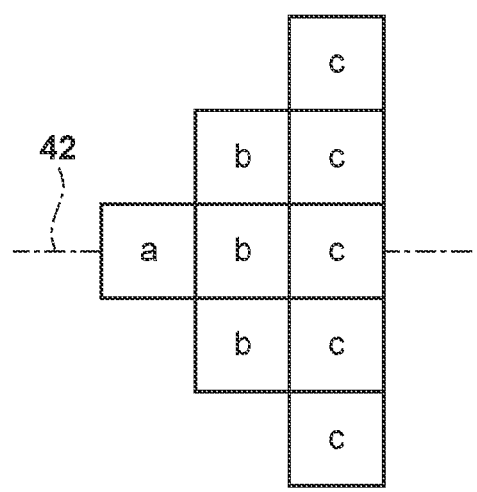

Next, a method of determining the correction value 115 for pixels other than intermediate pixels will be explained with reference to FIGS. 7A and 7B. FIG. 7A is a view showing pixels cut out from the vicinity of a line segment 42 connecting the center of the first unit region 31 and the center of an adjacent unit region. Pixels a, b, and c are intermediate pixels positioned on the line segment 42. In contrast, pixels 1, 2, 3, 4, 5, and 6 are pixels (to be referred to as "non-intermediate pixels" hereinafter) not positioned on the line segment 42. For the non-intermediate pixels, the correction value 115 is determined based on the following rule:

(rule) pixels present on a straight line perpendicular to the line segment 42 have the same correction value.

In other words, this rule means that the correction value 115 of an intermediate pixel positioned at an intersection point between the line segment 42, and a line that is perpendicular to the line segment 42 and passes through non-intermediate pixels is applied to these non-intermediate pixels. FIG. 7B shows the correction value 115 of each non-intermediate pixel shown in FIG. 7A that is determined according to this rule. As shown in FIG. 7B, the correction values 115 for non-intermediate pixels 1 to 6 are determined as follows:

the correction value 115 for pixels 1, 2, and b present on the same straight line perpendicular to the line segment 42 is the same as that for pixel b, the correction value 115 for pixels 3 to 6 and c present on the same straight line perpendicular to the line segment 42 is the same as that for pixel c An example of calculation of the correction value 115 will be described below. Here, polygons to which respective pixels in the first unit region 31 belong are assumed to be those shown in FIG. 6. Also, the differential vectors diff1 to diff5 of the first unit region 31 to fifth unit region 35 are assumed to have the following values:

diff1=(5, 4)
diff2=(3, 3)
diff3=(4, 6)
diff4=(7, 5)
diff5=(6, 5)

FIG. 8A shows a result of calculating the correction value 115 of an intermediate pixel based on the above-described calculation method of the correction value 115 using the thus-assumed differential vector. FIG. 8B shows a result of subsequently determining the correction value 115 of a non-intermediate pixel according to the above-described conditions and rule.

Note that the above-mentioned conditions and rule are merely examples and changeable. For example, a polygon to which pixels on the boundary line of the polygon belong in a unit region is determined to be a polygon on the left side when oriented to the center. However, this polygon may be a polygon on the right side. In other words, it is only necessary that diagonal pixels positioned on a line segment connecting the center of a unit region and one end of a boundary line belong to a polygon formed by the boundary line and the line segment, and diagonal pixels positioned on a line segment connecting the center and the other end of the line segment do not belong to this polygon. The relationship between pixels and a polygon to which they belong may be switchable by a switch operation by a user or the like. However, the conditions and rule should be common to a plurality of projectors constituting the multi-projection system.

Image Correction Unit

The operation of the image correction unit 13 will be explained. The operation of the image correction unit 13 changes as follows depending on the value of the correction execution signal 104:

if (correction execution signal 104=='1') {
projected position adjustment is executed for the target unit region of the input video 101;
pixels are moved (pixel values are corrected) based on the correction value 115 to generate the output video 105;
}
if (correction execution signal 104=='0') {
projected position adjustment is not executed for the target unit region of the input video 101;
the input video 101 of the unit region is output as the output video 105 without any change;
}

As for a correction method corresponding to the correction value 115 of a pixel that is calculated by the correction value calculation unit 26, any image conversion method is applicable. That is, the image correction unit 13 can be executed by a known technique. For example, when a plurality of pixels overlap each other as a result of movement corresponding to the correction value, superimposition calculation of an image is performed. When a given pixel is moved by the number of pixels corresponding to the decimal part, pixel values are proportionally distributed between the given pixel and a pixel overlapping it in the moving direction.

[Projected Position Adjustment Processing]

Figure 11:
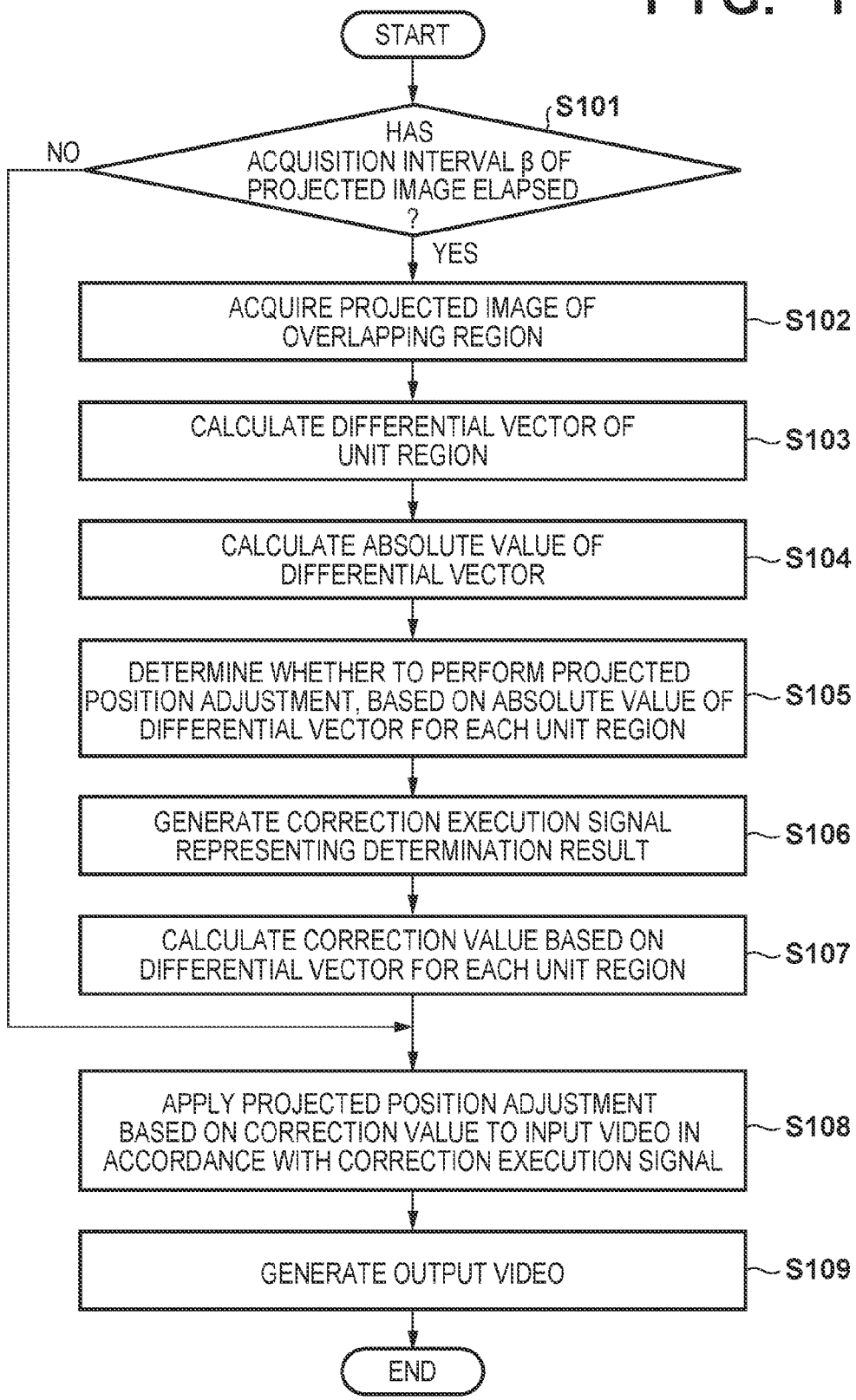
FIG. 11 is a flowchart for explaining the procedures of projected position adjustment processing according to the first embodiment.

The procedures of projected position adjustment processing will be explained with reference to the flowchart of FIG. 11. FIG. 11 shows procedures for, for example, one video frame. The procedures shown in FIG. 11 are repetitively executed at the above-mentioned interval α of projected position adjustment while the multi-projection system operates.

The image acquisition unit 11 determines whether the acquisition interval β (≤α) has elapsed after acquisition of the previous projected image 102 (S101). If the acquisition interval β has not elapsed, the image acquisition unit 11 advances the process to step S108. If the acquisition interval β has elapsed, the image acquisition unit 11 acquires the projected image 102 of the overlapping region from the image capturing device 1007 (S102), and advances the process to step S103.

The differential vector calculation unit 21 calculates, for each unit region, the differential vector 103 between the image of the corresponding region of the input video 101 and the projected image 102 (S103). The absolute value calculation unit 22 calculates the absolute value 111 of the differential vector 103 (S104).

The determination unit 23 determines, for each unit region, whether to perform projected position adjustment based on the absolute value 111 of the differential vector (S105), and generates the correction execution signal 104 representing the determination result (S106). The correction value calculation unit 26 calculates the correction value 115 for each unit region based on the differential vector 103 (S107).

The image correction unit 13 applies projected position adjustment based on the correction value 115 to the input video 101 in accordance with the correction execution signal 104 (S108), and generates and outputs the output video 105 (S109).

In this manner, the displacement of a projected position that is generated in an overlapping region when superimposed projection of a plurality of videos is performed can be adaptively corrected during projection of the videos serving as a moving image. In particular, projected position adjustment is performed for only a portion having a large displacement of the projected position. Thus, the processing load is reduced, appropriate correction is possible even for an inhomogeneous displacement of the projected position, and effective suppression of image quality degradation is expected.

Modification of Embodiment

An example in which the correction value calculation unit 26 calculates the correction value 115 for all unit regions has been described. However, whether to perform calculation of the correction value 115 may be determined in accordance with the correction execution signal 104. That is, as in the image correction unit 13, calculation of the correction value 115 is performed for a unit region for which the correction execution signal 104 is VALID, and is not performed for a unit region for which the correction execution signal 104 is INVALID. Accordingly, reduction of the processing amount of the correction determination unit 12 for calculation of the correction value is expected.

Also, an example in which projected position adjustment is possible in each of a plurality of projectors constituting the multi-projection system has been described. However, all the projectors need not perform projected position adjustment. In practice, it is effective to classify all the projectors constituting the multi-projection system into reference devices that do not perform projected position adjustment, and correction devices that perform projected position adjustment. For example, when multiple projection is performed, it is effective that one of projects whose projected positions are adjacent to each other is set as a reference device, and the other one is set as a correction device.

When the projectors constituting the multi-projection system are classified into reference devices and correction devices, the present invention is implemented even by incorporating the image processing apparatus 10 shown in FIG. 2 into each correction device. In other words, a projector serving as a correction device in which the image processing apparatus 10 is incorporated falls within the scope of the present invention.

In addition, an example in which the unit region is a square of 5×5 pixels has been described. However, the size and shape of the unit region are not limited to this example, and the size and shape may be further changed in accordance with the image position. For example, the displacement of a pixel position is generally large at the peripheral portion in an overlapping region, and the displacement is small at the center portion. Therefore, the size of the unit region is decreased at the peripheral portion and increased at the center portion, which is effective for reduction of the processing load.

Second Embodiment

An image processing apparatus, an image processing method, and a projection apparatus according to the second embodiment of the present invention will be described below. Even in a multi-projection system according to the second embodiment, projected position adjustment is performed for each unit region, as in the first embodiment described above, but the correction execution determination method is different.

The first embodiment has described an example in which the correction target is a unit region having a large absolute value mag (displacement amount of the pixel position) of the differential vector. However, an observer of a projected image does not feel the region unnatural from only the displacement amount of the pixel position. For example, if the displacement of the pixel position is small, the observer readily feels unnatural even a region having a small motion. In a region having high brightness, the displacement relatively stands out. In the second embodiment, the correction target is a unit region readily felt unnatural by the observer, using the moving vector and/or brightness information in addition to the displacement amount of the pixel position.

Figure 9:
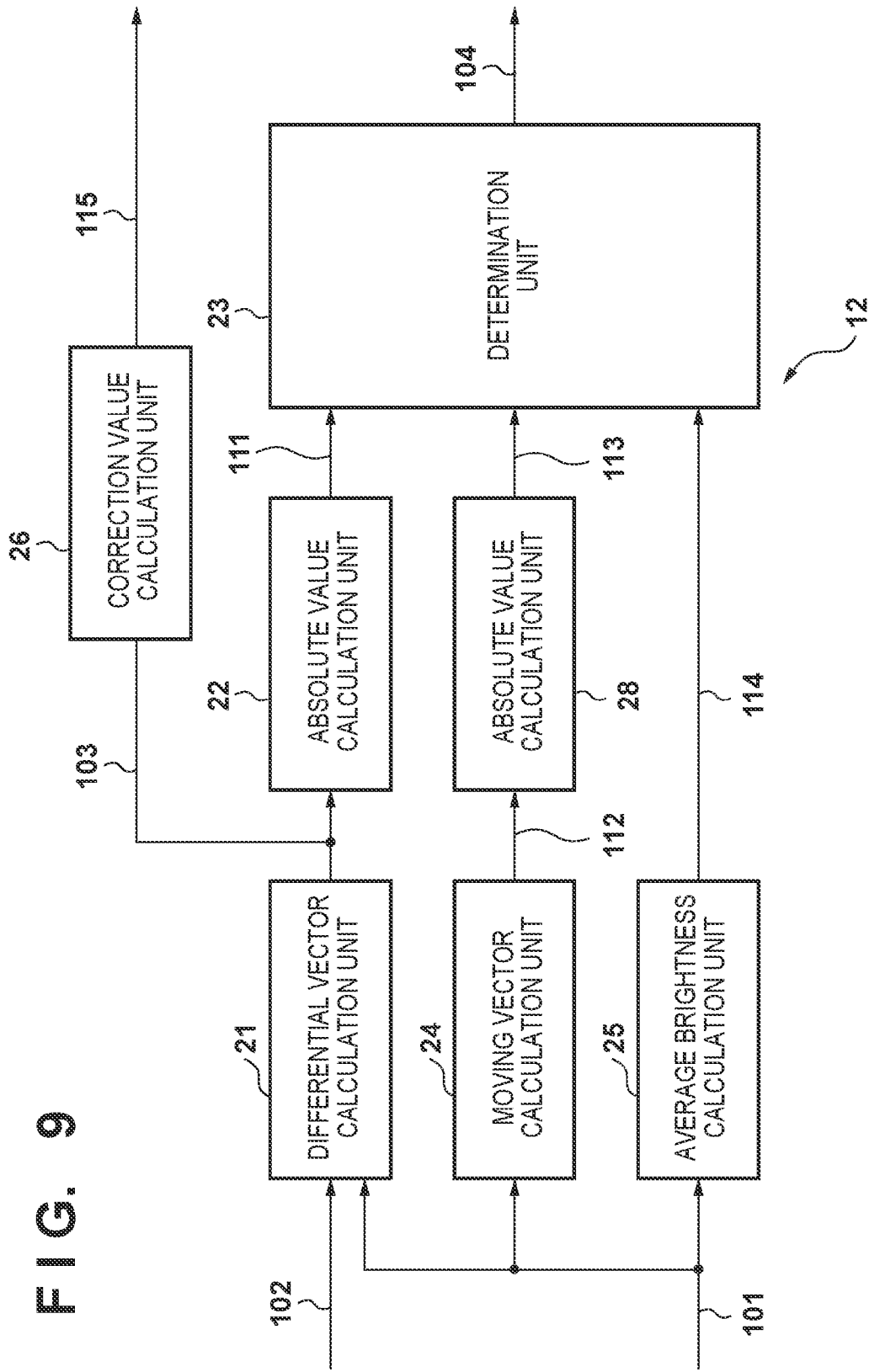
FIG. 9 is a block diagram showing the arrangement of a correction determination unit according to the second embodiment.

An image processing apparatus in the multi-projection system according to the second embodiment includes an image acquisition unit 11, a correction determination unit 12, and an image correction unit 13, as in the above-described first embodiment, but the arrangement of the correction determination unit 12 is different. FIG. 9 shows the arrangement of the correction determination unit 12 according to the second embodiment.

In addition to the arrangement shown in FIG. 2, the correction determination unit 12 according to the second embodiment includes a moving vector calculation unit 24, an absolute value calculation unit 28, and an average brightness calculation unit 25, and processing of a determination unit 23 according to the second embodiment is different from that according to the first embodiment.

The moving vector calculation unit 24 calculates a moving vector 112 of an input video 101 for each unit region in a corresponding region. As a moving vector calculation method, various known methods are applicable, including a method using a frame correlation.

The absolute value calculation unit 28 obtains an absolute value 113 of the moving vector 112 by the same calculation as that of the absolute value calculation unit 22. The determination unit 23 uses the absolute value 113 of the moving vector for generation of a correction execution signal 104.

The average brightness calculation unit 25 calculates an average brightness value 114 of a unit region in the corresponding region:

$$avg = \{\Sigma bri(j)\}/n \quad (5)$$

where avg is the average brightness value, j is the identification number of a pixel belonging to the unit region, bri(j) is the brightness value of the pixel having the identification number j, and n is the number of pixels belonging to the unit region.

Note that equation (5) represents an example in which a total average is calculated as the average brightness value 114, but the average brightness value 114 is not limited to the total average. The calculation interval of the average brightness value 114 is not limited to every video frame.

Processing of the determination unit 23 in the second embodiment is different from that in the first embodiment, and the determination unit 23 determines whether to execute correction using the absolute value 113 of a moving vector and the average brightness value 114, in addition to an absolute value 111 of a differential vector. As in the first embodiment, the determination unit 23 determines whether to execute correction for each unit region, and outputs the determination result as the correction execution signal 104 as in the first embodiment.

Figure 10:
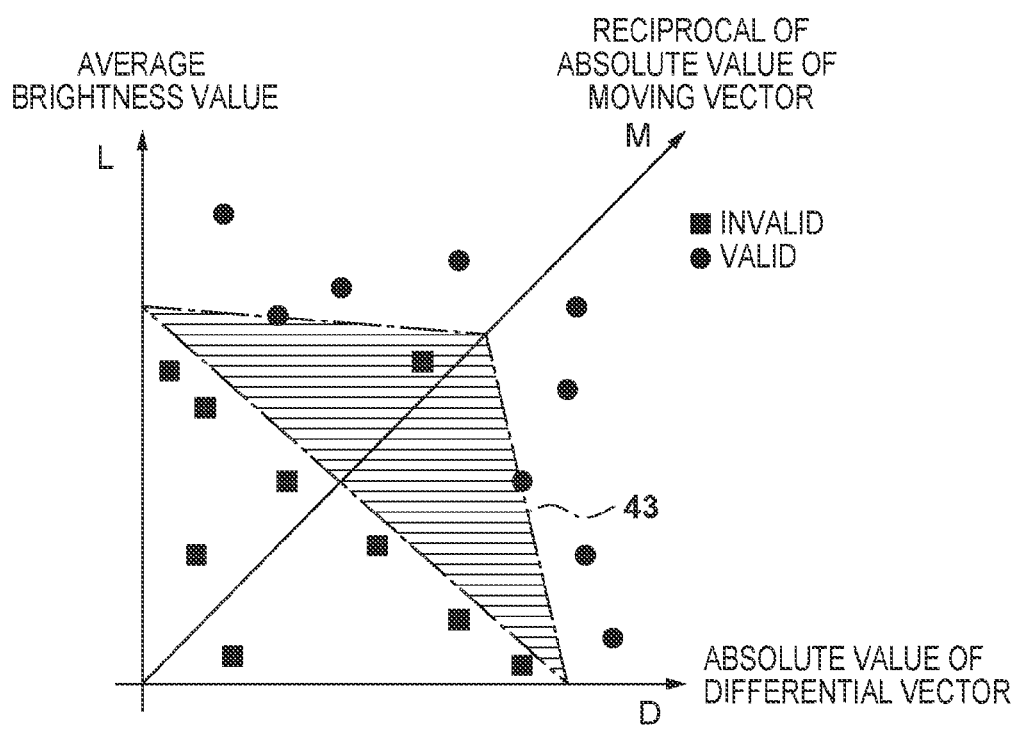
FIG. 10 is a graph for explaining a method of determining whether to execute projected position adjustment according to the second embodiment.

The determination of whether to execute projected position adjustment in the second embodiment is performed by applying a three elements correlation diagram shown in FIG. 10. As shown in FIG. 10, the three elements correlation diagram is represented by a three-dimensional orthogonal coordinate system of D, M, and L. The respective axes shown in FIG. 10 correspond to the following values:

D-axis: the absolute value 111 of the differential vector

M-axis: the reciprocal of the absolute value 113 of the moving vector

L-axis: the average brightness value 114

When performing determination, the determination unit 23 adds predetermined weights to the absolute value 111 of the differential vector, the reciprocal of the absolute value 113 of the moving vector, and the average brightness value 114. The weights to be added are determined in advance in accordance with the characteristic of the projector, and held in the determination unit 23. For example, if the influence of the average brightness value 114 is highly evaluated, the weight of the average brightness value 114 is increased. Note that each weight may be rewritable by the user of the projector, as needed.

The determination unit 23 determines whether to execute correction according to the following procedures:

Step 1: The absolute value 111 of the differential vector, the reciprocal of the absolute value 113 of the moving vector, and the average brightness value 114 are weighted, respectively.

Step 2: Points corresponding to the absolute value 111 of the differential vector, the reciprocal of the absolute value 113 of the moving vector, and the average brightness value 114 after weighting are arranged in the three elements correlation diagram for each unit region.

Step 3: Whether to execute correction is determined for the arranged points in accordance with the positional relationship with a threshold plane 43:

if (a point is positioned on the origin side (inside) with respect to the threshold plane 43)

not to execute correction;

if (a point is positioned on or outside the threshold plane 43)

to execute correction;

In other words, the determination unit 23 arranges, in a three-dimensional space, points corresponding to the absolute value 111 of the differential vector, the reciprocal of the absolute value 113 of the moving vector, and the average brightness value 114 for each unit region. Based on the correspondence between points in a unit region of interest and the predetermined threshold plane 43, the determination unit 23 determines whether to execute projected position adjustment in the unit region of interest.

By comparing points representing the characteristics of a unit region with the threshold plane in the three elements correlation diagram in this way, a region where the displacement of the pixel position is large, the absolute value of the moving vector is small, and the brightness value is high, in other words, a region readily felt unnatural by the observer is determined, and projected position adjustment is executed in this region. Thus, a region readily felt unnatural by the observer can be dynamically determined, and projected position adjustment can be performed preferentially for this region.

[Projected Position Adjustment Processing]

Figure 12:
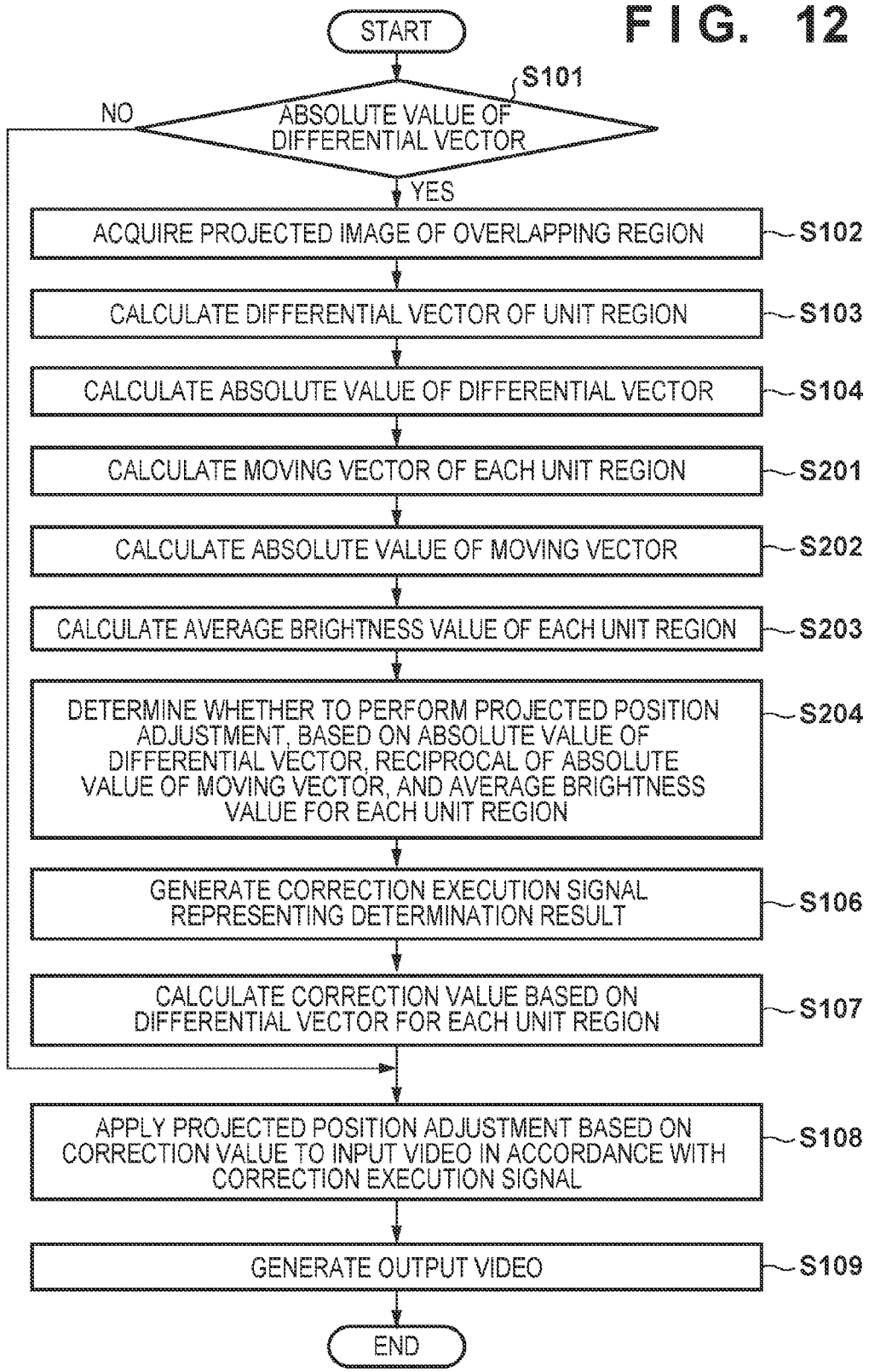
FIG. 12 is a flowchart for explaining the procedures of projected position adjustment processing according to the second embodiment.

The procedures of projected position adjustment processing will be explained with reference to the flowchart of FIG. 12. FIG. 12 shows procedures for, for example, one video frame. As a matter of course, the procedures shown in FIG. 12 are repetitively executed at the above-mentioned interval $\alpha$ of projected position adjustment while the multi-projection system operates.

Determination of the lapse of the acquisition interval $\beta$ (S101), acquisition of a projected image 102 (S102), calculation of a differential vector 103 (S103), and calculation of the absolute value 111 of the differential vector (S104) are the same as those in the first embodiment.

The moving vector calculation unit 24 calculates the moving vector 112 of each unit region from the input video 101 (S201). The absolute value calculation unit 28 calculates the absolute value 113 of the moving vector 112 (S202). The average brightness calculation unit 25 calculates the average brightness value 114 of each unit region from the input video 101 (S203).

Based on the absolute value 111 of the differential vector, the reciprocal of the absolute value 113 of the moving vector, and the average brightness value 114, the determination unit 23 determines whether to perform projected position adjustment for each unit region (S204).

Generation of the correction execution signal 104 (S106), calculation of the correction value 115 (S107), application of projected position adjustment (S108), and generation of an output video 105 (S109) are the same as those in the first embodiment.

Modification of Second Embodiment

The threshold plane 43 is determined in advance in accordance with the characteristic of the projector, and is held in the determination unit 23. However, the threshold plane 43 may be not fixed but rewritable by the user of the projector, as needed. An example in which a correction target unit region is determined using the three dimensions of the differential vector, moving vector, and average brightness value has been described. However, a correction target unit region can also be determined using the two dimensions of the differential vector and moving vector or the two dimensions of the differential vector and average brightness value.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-256675 filed Dec. 18, 2014 which is hereby incorporated by reference herein in its entirety.

What is claimed is:

1. An image processing apparatus comprising:
a hardware processor; and
a memory which stores instructions to be executed by the hardware processor, wherein in accordance with the instructions executed by the hardware processor, the image processing apparatus performs:
acquiring a captured image including at least an image of an overlapping region in a projection surface on which a first projected image projected by a first projection-type display apparatus and a second projected image projected by a second projection-type display apparatus are being displayed with an overlap;
obtaining, based on the captured image acquired in the acquiring, information of a positional difference between the first projected image projected by the first projection-type display apparatus and the second projected image projected by the second projection-type display apparatus in each of a plurality of partial regions in the overlapping region;
determining, based on the information obtained in the obtaining, a plurality of correction values for correcting positional differences between the first projected image projected by the first projection-type display apparatus and the second projected image projected by the second projection-type display apparatus in the plurality of partial regions in the overlapping region; and
correcting, by using the plurality of correction values determined in the determining, the positional differences between the first projected image projected by the first projection-type display apparatus and the second projected image projected by the second projection-type display apparatus in the plurality of partial regions in the overlapping region.

2. The image processing apparatus according to claim 1, wherein in the obtaining, a differential vector representing an amount and a direction of the positional difference is obtained as the information for each of the plurality of partial regions.

3. The image processing apparatus according to claim 1, wherein in accordance with the instructions executed by the hardware processor, the image processing apparatus further performs:
deciding, based on an amount of the positional difference in a partial region indicated by the information obtained in the obtaining and a predetermined threshold, whether or not correction processing for correcting the positional difference in the partial region is to be performed.

4. The image processing apparatus according to claim 3, wherein
in the correcting, the positional difference in the partial region is corrected by the correction processing in a case where the correction processing for the partial region is decided to be performed in the deciding.

5. The image processing apparatus according to claim 1, wherein in the determining, a correction value for a first partial region is determined based on a positional difference in the first partial region and a positional difference in a second partial region adjacent to the first partial region.

6. The image processing apparatus according to claim 4, wherein in the correction processing, a value of a pixel in the partial region is corrected in accordance with a correction value corresponding to the partial region determined in the determining.

7. The image processing apparatus according to claim 2, wherein in the determining, with regard to each intermediate pixel located on a line segment connecting between a center of a first partial region and a center of a second partial region adjacent to the first partial region, a correction value is determined by calculating, (a) as an x-component of the correction value, a harmonic progression having an x-component of a first differential vector for the first partial region or a second differential vector for the second partial region as an upper limit value or lower limit value, and (b) as a y-component of the correction value, a harmonic progression having a y-component of the first or second differential vector as an upper limit value or lower limit value.

8. The image processing apparatus according to claim 7, wherein, in a case when the x-component of the first differential vector is equal to the x-component of the second differential vector, the x-component of the first differential vector is set to the x-component of the correction value, and
in a case when the y-component of the first differential vector is equal to the y-component of the second differential vector, the y-component of the first differential vector is set to the y-component of the correction value.

9. The image processing apparatus according to claim 7, wherein, with regard to each non-intermediate pixel which is not located on the line segment, the correction value of an intermediate pixel is applied to the non-intermediate pixel, and
wherein the intermediate pixel is located on an intersection of the line segment and a line perpendicular to the line segment and passing through the non-intermediate pixel.

10. The image processing apparatus according to claim 5, wherein the second partial region used for determining the correction value for the first partial region is determined based on belonging relationship between the pixel and polygons, and
wherein the polygons are formed by boundary lines between the first partial region and other partial regions adjacent to the first partial region, and line segments connecting between a center of the first partial region and both ends of each of the boundary lines.

11. The image processing apparatus according to claim 10, wherein a diagonal pixel located on a line segment connecting between the center of the first partial region and an end of a boundary line belongs to a polygon formed by the line segment and the boundary line, and a diagonal pixel located on a line segment connecting between the center and another end of the boundary line does not belong to the polygon.

12. The image processing apparatus according to claim 11, wherein a center pixel of the first partial region belongs to all of the polygons.

13. The image processing apparatus according to claim 12, wherein each of pixels in the first partial region excluding the center pixel and the diagonal pixel belongs a polygon including the pixel.

14. The image processing apparatus according to claim 3, wherein in accordance with the instructions executed by the hardware processor, the image processing apparatus further performs:
obtaining information of a moving amount of images to be projected on the overlapping region,
wherein in the deciding, whether or not the correction processing is to be performed is decided based on the amount of the positional difference and the moving amount of the images indicated by the obtained information.

15. The image processing apparatus according to claim 3, wherein in accordance with the instructions executed by the hardware processor, the image processing apparatus further performs:
obtaining information of brightness of an image to be projected on the overlapping region,
wherein in the deciding, whether or not the correction processing is to be performed is decided based on the amount of the positional difference and the brightness of the image indicated by the obtained information.

16. The image processing apparatus according to claim 3, wherein in accordance with the instructions executed by the hardware processor, the image processing apparatus further performs:
obtaining information of a moving amount of images to be projected on the overlapping region and information of brightness of an image to be projected on the overlapping region,
wherein in the deciding, whether or not the correction processing is to be performed is decided based on the amount of the positional difference, the moving amount of the images, and the brightness of the image indicated by the obtained information.

17. The image processing apparatus according to claim 1, wherein the image processing apparatus is incorporated in the first projection-type display apparatus.

18. The image processing apparatus according to claim 1, wherein in the correcting, the positional differences between the first projected image and the second projected image are corrected at least one pixel value of an input image to be projected by the first projection-type display apparatus.

19. The image processing apparatus according to claim 1, wherein in the obtaining, the information of the positional difference is obtained based on the captured image and an input image corresponding to the first projected image.

20. The image processing apparatus according to claim 2, wherein in accordance with the instructions executed by the hardware processor, the image processing apparatus further performs:
deciding, based on an absolute value of the differential vector for a partial region indicated by the information obtained in the obtaining, whether correction processing for correcting the positional difference in the partial region is to be performed or not.

21. An image processing method of performing projection-position correction in a superimposed projection of a plurality of videos, the method comprising:
   using a processor to perform:
      acquiring a captured image including at least an image of an overlapping region in a projection surface on which a first projected image projected by a first projection-type display apparatus and a second projected image projected by a second projection-type display apparatus are being displayed with an overlap;
      obtaining, based on the captured image acquired in the acquiring, information of a positional difference between the first projected image projected by the first projection-type display apparatus and the second projected image projected by the second projection-type display apparatus in each of a plurality of partial regions in the overlapping region;
      determining, based on the information obtained in the obtaining, a plurality of correction values for correcting positional differences between the first projected image projected by the first projection-type display apparatus and the second projected image projected by the second projection-type display apparatus in the plurality of partial regions in the overlapping region; and
      correcting, by using the plurality of correction values determined in the determining, the positional differences between the first projected image projected by the first projection-type display apparatus and the second projected image projected by the second projection-type display apparatus in the plurality of partial regions in the overlapping region.

22. A non-transitory computer readable medium storing a computer-executable program for causing a computer to perform an image processing method of performing projection-position correction in a superimposed projection of a plurality of videos, the method comprising:
   acquiring a captured image including at least an image of an overlapping region in a projection surface on which a first projected image projected by a first projection-type display apparatus and a second projected image projected by a second projection-type display apparatus are being displayed with an overlap;
   obtaining, based on the captured image acquired in the acquiring, information of a positional difference between the first projected image projected by the first projection-type display apparatus and the second projected image projected by the second projection-type display apparatus in each of a plurality of partial regions in the overlapping region;
   determining, based on the information obtained in the obtaining, a plurality of correction values for correcting positional differences between the first projected image projected by the first projection-type display apparatus and the second projected image projected by the second projection-type display apparatus in the overlapping region; and
   correcting, by using the plurality of correction values determined in the determining, the positional differences between the first projected image projected by the first projection-type display apparatus and the second projected image projected by the second projection-type display apparatus in the plurality of partial regions in the overlapping region.

* * * * *